(12) United States Patent
Bendersky

(10) Patent No.: US 10,652,241 B1
(45) Date of Patent: May 12, 2020

(54) DYNAMIC AND SECURE COUPLING BETWEEN AUXILIARY DEVICES AND ENDPOINT RESOURCES

(71) Applicant: CyberArk Software Ltd., Petach-Tikva (IL)

(72) Inventor: Arthur Bendersky, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/424,933

(22) Filed: May 29, 2019

(51) Int. Cl.
*H04L 9/00* (2006.01)
*H04L 29/06* (2006.01)

(52) U.S. Cl.
CPC ........ *H04L 63/0876* (2013.01); *H04L 63/102* (2013.01)

(58) Field of Classification Search
CPC .................................................... H04L 63/102
See application file for complete search history.

(56) References Cited

U.S. PATENT DOCUMENTS

| | | | | |
|---|---|---|---|---|
| 9,038,152 | B1 * | 5/2015 | Vazquez | H04L 63/08 726/6 |
| 9,294,455 | B2 * | 3/2016 | Nassar | H04L 67/148 |
| 2001/0025273 | A1 * | 9/2001 | Walker | G06Q 20/00 705/77 |
| 2013/0268767 | A1 * | 10/2013 | Schrecker | G06F 21/31 713/185 |
| 2015/0332029 | A1 * | 11/2015 | Coxe | H04L 63/0815 726/9 |
| 2016/0197706 | A1 * | 7/2016 | Lester | H04L 63/0435 709/226 |

* cited by examiner

*Primary Examiner* — Josnel Jeudy
(74) *Attorney, Agent, or Firm* — Finnegan, Henderson, Farabow, Garrett & Dunner, LLP

(57) ABSTRACT

Disclosed embodiments relate to systems and methods for dynamically providing coupling between auxiliary computing devices and secure endpoint computing resources. Techniques include identifying a request for an identity to access an endpoint computing resource; obtaining a unique session identifier in response to the request; transmitting the unique session identifier via short-range communications from the endpoint computing resource to an auxiliary computing device associated with the identity; obtaining, in response to the auxiliary computing device transmitting the unique session identifier and the identification data, authentication data sufficient to comply with the authentication requirement of the endpoint computing resource; and dynamically coupling the identity to the endpoint computing resource based on the authentication data and consistent with the authentication requirement.

20 Claims, 13 Drawing Sheets

DYNAMIC AND SECURE COUPLING BETWEEN AUXILIARY DEVICES AND ENDPOINT RESOURCES

BACKGROUND

Typical applications requiring authentication rely on usernames and passwords. This basic authentication technique is used in many types of environments, from social media services, to business applications, to Internet-of-Things (IoT) software. Through a username and password, a minimal level of confirmation may be obtained that an identity seeking access to an application is who they purport to be.

But usernames and passwords have significant security limitations. If such credentials are obtained by an unauthorized person (e.g., through credential theft, guessing, keystroke logging, or other techniques) they cease to provide any security. To the contrary, the unauthorized person can impersonate the rightful user and perform all actions that the rightful user is able to perform. Further, organizations often impose requirements on passwords (e.g., length requirements, complexity requirements, expiration requirements, etc.) that cause users to forget their passwords. This in turn causes burdens for both the users and the organizations who must address requests to reveal or reset passwords.

Two-factor authentication can offer enhanced security over traditional username-and-password security. By requiring, for example, a password and a biometric verification, some added security may be achieved. Similarly, requiring a user to present a password and a value from a portable fob (e.g., RSA SecurID™, etc.) can add protection over basic username-and-password security. Nevertheless, two-factor authentication also has drawbacks. For example, techniques such as these are unable to concurrently authenticate an identity and the identity's physical presence proximate to an endpoint resource they are attempting to access. In addition, many two-factor authentication techniques are cumbersome or inefficient, which can lead some users to implement workarounds or other insecure approaches to dealing with secure resources. Further, these techniques are unable to dynamically couple an identity to a secure session, such as by provisioning relevant authentication or authorization credentials, or by obtaining an identity from an identity provider.

Accordingly, in view of these and other deficiencies in existing techniques for authentication and secure access to resources, technological solutions are needed for efficiently providing authentication of identities. Solutions ideally should allow for a two-mode authentication, where both the identity itself and its physical proximity to an endpoint it is seeking to access are verified. Further, solutions should automatically provision authenticated identities with appropriate levels of secure access to the endpoint (e.g., partially privileged access or non-privileged access).

SUMMARY

Various disclosed embodiments describe non-transitory computer readable media, systems, and methods for dynamically providing coupling between auxiliary computing devices and secure endpoint computing resources.

For example, in an exemplary embodiment, there may be a non-transitory computer readable medium including instructions that, when executed by at least one processor, cause the at least one processor to perform operations for dynamically providing coupling between auxiliary computing devices and secure endpoint computing resources. The operations may comprise identifying a request for an identity to access an endpoint computing resource, the endpoint computing resource having an authentication requirement for access by the identity, wherein the request does not include authentication credentials for the identity; obtaining a unique session identifier in response to the request; transmitting the unique session identifier via short-range communications from the endpoint computing resource to an auxiliary computing device associated with the identity; wherein the auxiliary computing device is configured to transmit via short-range communications the unique session identifier and identification data associated with at least one of the identity or the auxiliary computing device to at least one of the endpoint computing resource or an intermediate service separate from the endpoint computing resource; obtaining, in response to the auxiliary computing device transmitting the unique session identifier and the identification data, authentication data sufficient to comply with the authentication requirement of the endpoint computing resource; and dynamically coupling the identity to the endpoint computing resource based on the authentication data and consistent with the authentication requirement.

According to a disclosed embodiment, the unique session identifier is received from the intermediate service separate from the endpoint computing resource.

According to a disclosed embodiment, the operations further comprise generating, in response to the request, the unique session identifier.

According to a disclosed embodiment, transmitting the unique session identifier includes encoding the unique session identifier into a barcode and making available the barcode for display to the auxiliary computing device.

According to a disclosed embodiment, the auxiliary computing device is configured to optically scan and decode the barcode to yield the unique session identifier.

According to a disclosed embodiment, transmitting the unique session identifier includes transmitting via Bluetooth the unique session identifier to the auxiliary computing device.

According to a disclosed embodiment, transmitting the unique session identifier includes transmitting via audible communications the unique session identifier to the auxiliary computing device.

According to a disclosed embodiment, dynamically coupling the identity to the endpoint computing resource includes granting the identity full access corresponding to access rights of the identity.

According to a disclosed embodiment, dynamically coupling the identity to the endpoint computing resource includes granting the identity limited access corresponding to less than all access rights of the identity.

According to a disclosed embodiment, the limited access includes at least one of temporary access to the endpoint computing resource or one-time access to the endpoint computing resource.

According to another disclosed embodiment, there may be a computer-implemented method for dynamically providing coupling between auxiliary computing devices and secure endpoint computing resources. The method may comprise identifying a request for an identity to access an endpoint computing resource, the endpoint computing resource having an authentication requirement for access by the identity, wherein the request does not include authentication credentials for the identity; obtaining a unique session identifier in response to the request; transmitting the unique session identifier via short-range communications from the endpoint computing resource to an auxiliary computing device associated with the identity; wherein the auxiliary computing device is configured to transmit via short-range communications the unique session identifier and identification data associated with at least one of the identity or the auxiliary computing device to at least one of the endpoint computing resource or an intermediate service separate from the endpoint computing resource; obtaining, in response to the auxiliary computing device transmitting the unique session identifier and the identification data, authentication data sufficient to comply with the authentication requirement of the endpoint computing resource; and dynamically coupling the identity to the endpoint computing resource based on the authentication data and consistent with the authentication requirement.

According to a disclosed embodiment, transmitting the unique session identifier includes encoding the unique session identifier into an encoded data representation and making available the encoded data representation for display to the auxiliary computing device.

According to a disclosed embodiment, the encoded data representation is inserted into a web page accessible to the auxiliary computing device.

According to a disclosed embodiment, the encoded data representation is inserted into a graphical interface of an application accessible to the auxiliary computing device.

According to a disclosed embodiment, the encoded data representation is displayed on a display screen accessible to the auxiliary computing device.

According to a disclosed embodiment, the obtained authentication data is a security assertion markup language credential.

According to a disclosed embodiment, the obtained authentication data is an OpenID credential.

According to a disclosed embodiment, dynamically coupling the identity to the endpoint computing resource includes granting the identity full access corresponding to access rights of the identity.

According to a disclosed embodiment, dynamically coupling the identity to the endpoint computing resource includes granting the identity limited access corresponding to less than all access rights of the identity.

According to a disclosed embodiment, the limited access includes at least one of temporary access to the endpoint computing resource or one-time access to the endpoint computing resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However; it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of secure and efficient authentication and dynamic session coupling described herein overcome several technological problems in the art. In contrast to conventional authentication techniques, which are prone to security weaknesses and/or cumbersome implementations, the techniques described below are both secure and low-friction for users and participating systems.

According to the techniques described below, an identity may be authenticated and automatically provisioned with an appropriate level of access rights without being required to supply a password or other credential. The identity may request access to an endpoint resource, where the request does not include authentication credentials. The endpoint may then obtain and make available to an auxiliary device (e.g., mobile phone, tablet, etc.) of the identity a unique session identifier. For example, the unique session identifier may be made available over short-range communications, such as a visually displayed QR code, an audibly transmitted signal, a Bluetooth™ transmission, or a near-field communication (NFC) transmission, among other potential options. The auxiliary device may then transmit the unique session identifier and identifying data to either the endpoint or an intermediary resource, in response to which the particular identity can be verified and an appropriate level of access rights to the endpoint can be determined. The identity may be dynamically coupled to the endpoint in a secure and customized session appropriate for the identity and the endpoin.

Reference will now be made in detail to the disclosed embodiments, examples of which are illustrated in the accompanying drawings.

Figure 1A:
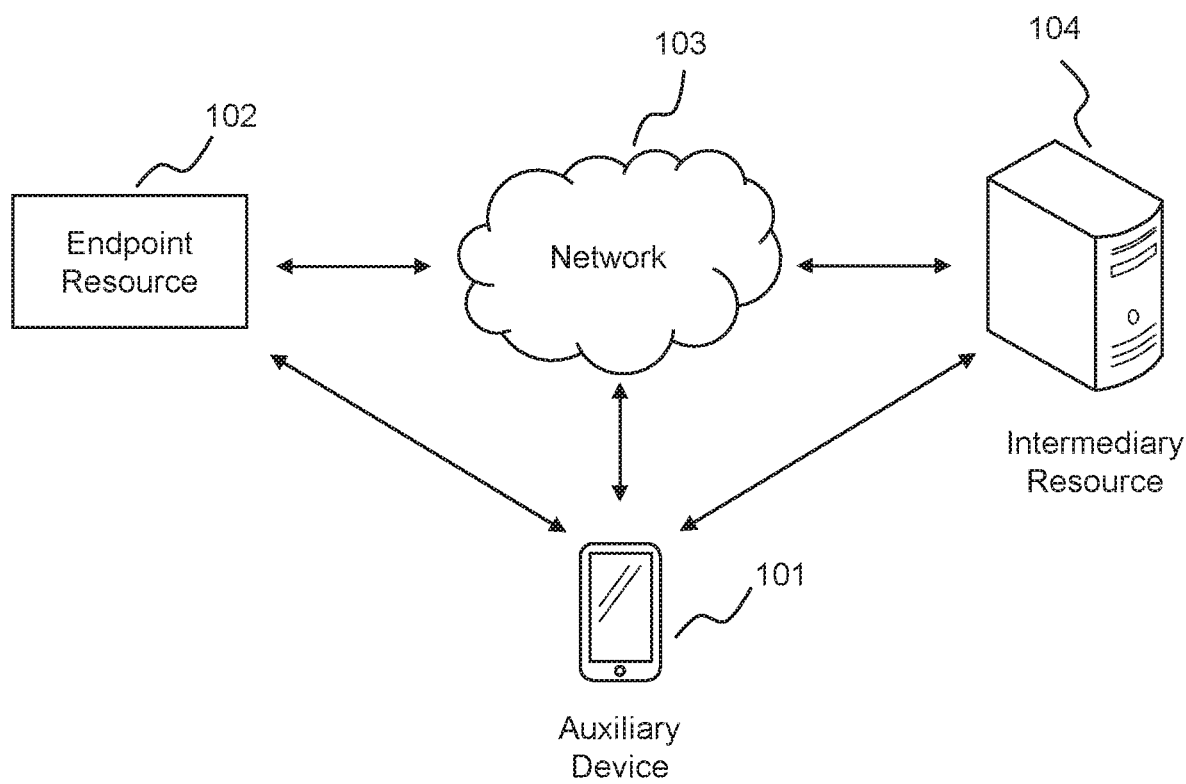
FIG. 1A is a block diagram of an exemplary system for dynamically providing coupling, without an identity provider, between auxiliary computing devices and secure endpoint computing resources in accordance with disclosed embodiments.

FIG. 1A illustrates an exemplary system 100A for dynamically providing coupling between auxiliary computing devices 101 and secure endpoint computing resources 102. As illustrated, auxiliary computing devices 101 may detect (e.g., optically scan, audibly detect, etc.) a unique session identifier, or an encoded version of a unique session identifier, that is made available from endpoint resource 102. In some embodiments, the transmission, or encoded transmission (e.g., QR code, audible code, etc.), may also include a cryptographic key. Once auxiliary computing device 101 receives and/or decodes the message from endpoint resource 102, auxiliary computing device 101 can transmit via short-range communications the unique session identifier and identifying data to either the endpoint 102 or an intermediate resource 104. The endpoint 102 may then obtain (e.g., retrieve or look up) authentication data sufficient to dynamically provision a secure session between the identity and endpoint 102.

In various embodiments, auxiliary computing device 101 may be a computing device with hardware and software configured to receive, decode, and process machine-readable codes. For example, auxiliary computing device 101 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home device, industrial device, etc.), personal computer (e.g., a desktop or laptop), or various other types of devices capable of processing and/or receiving data. Exemplary components of auxiliary computing device 101 are further discussed below in connection with FIG. 2A.

Endpoint resource 102 may be a computing resource or application of various types that an identity associated with auxiliary device 101 is attempting to access. For example, in some embodiments endpoint resource 102 may be a server, gateway, security agent, or other resource in an enterprise network that is deployed to require authentication of an identity associated with auxiliary device 101 in order for the identity to access a secure application or other resource running on endpoint resource 102. Similarly, in a hotel or building security environment, endpoint resource 102 may be part of the hotel or building network and configured to require authentication of the identity before access is permitted to a particular room or other area. In further embodiments, endpoint resource 102 may be remotely situated from the service it is protecting. For example, endpoint resource 102 may be a server, virtual machine (e.g., based on AWS™, Azure™, IBM Cloud™, etc.), container instance (e.g., Docker™ container, Java™ container, Windows Server™ container, etc.), or other virtualized instance. In additional embodiments, endpoint resource 102 may be an IoT device, such as a network-connected appliance, vehicle, room, building, parking garage, etc. Exemplary components of endpoint resource 102 are further discussed below in connection with FIG. 2B.

In some embodiments, auxiliary device 101 communicates directly with endpoint resource 102. For example, such direct communications may be short-range wireless communications (e.g., NFC, RFID, Bluetooth™, Bluetooth™ low energy, infrared, etc.). In further embodiments, such direct communications may include audible communications (e.g., based on a loudspeaker and microphone), light-based communications, vibration-based communications, or other types of local and wireless communications. In further embodiments, such direct communications may be wired (as opposed to wireless) communications (e.g., using USB, Ethernet, Firewire, eSATA, etc.). As discussed further below, communications between auxiliary device 101 and endpoint resource 102 may involve machine-readable codes encoding certain information (e.g., unique session identifiers, cryptographic keys, etc.), unique session identifiers or cryptographic keys themselves, or session data.

In further embodiments, auxiliary device 101 communicates indirectly with endpoint resource 102 via network 103. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, infrared, etc.), or various other types of network communications. In some embodiments, the communications may take place across two or more of these forms of networks and protocols. Like the direct communications noted above, communications between auxiliary device 101 and endpoint resource 102 via network 103 may involve machine-readable codes encoding certain information (e.g., unique session identifier, cryptographic keys, etc.) and session data.

In some embodiments, as discussed further below, when endpoint resource 102 makes available a machine-readable code to personal computing device 101, the code is made available to a display medium for auxiliary device 101 to read. For example, the display medium may be a webpage (e.g., HTML-based, Java™-based, Flash™-based, etc.) being accessed by auxiliary device 101, an application interface being displayed on auxiliary device 101, a physical medium accessible to auxiliary device 101 (e.g., a television screen, display screen, projected image, printed card, printed sticker, printed page, etc.), or other display media. In such situations, the machine-readable code may be transmitted from endpoint resource 102 via network 103 to the display medium accessible to auxiliary device 101.

Figure 1B:
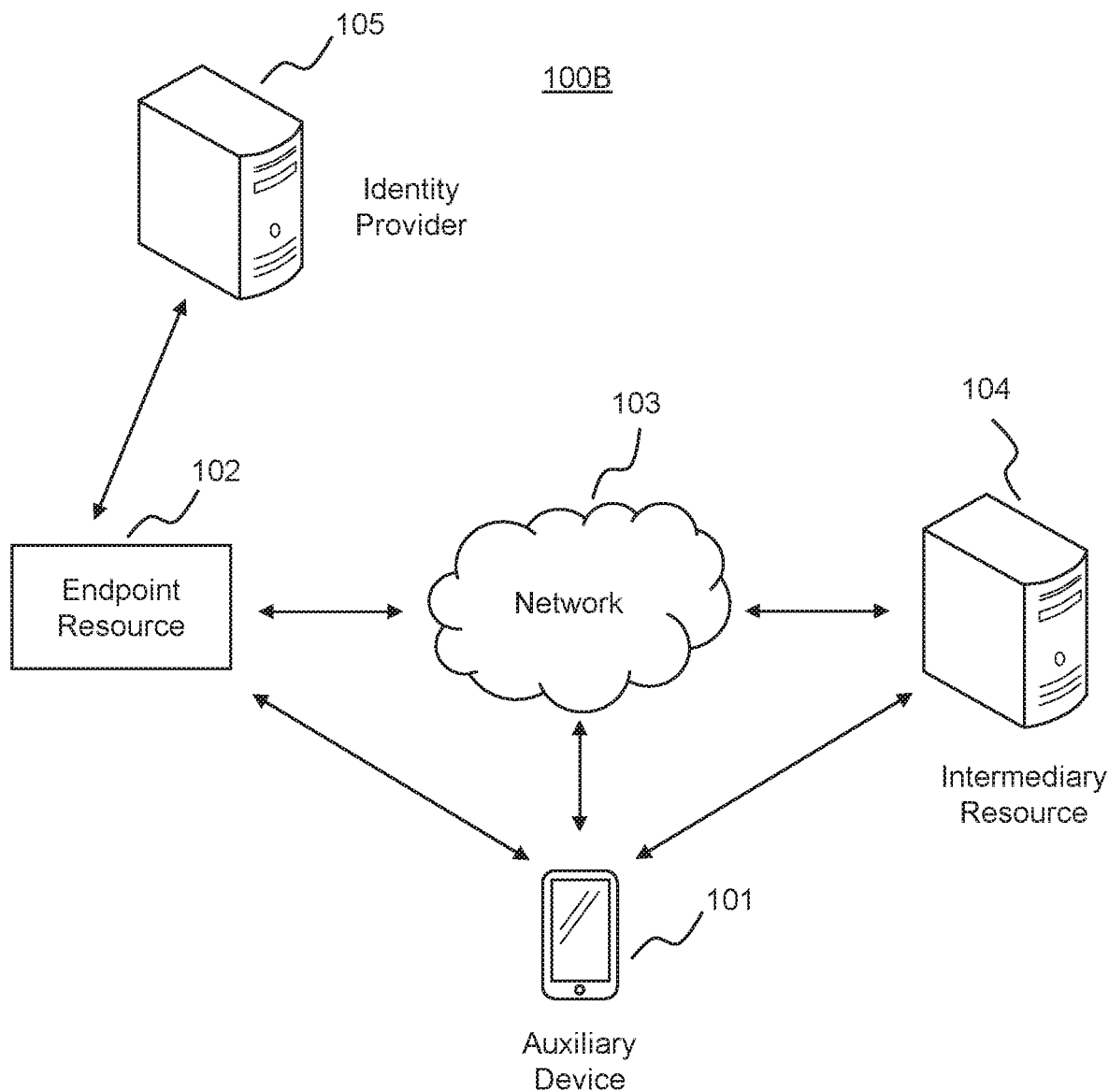
FIG. 1B is a block diagram of an exemplary system for dynamically providing coupling, with an identity provider, between auxiliary computing devices and secure endpoint computing resources in accordance with disclosed embodiments.

FIG. 1B illustrates a variation on FIG. 1A, where system 100B includes an identity provider 105 in communication with endpoint resource 102. Identity provider 105 may be an application integrated into endpoint resource 102 or may be hosted on a separate machine. As discussed further below, once the identity associated with auxiliary device 101 has been authenticated, a secure session may be provisioned between the identity and endpoint resource 102. While in some situations endpoint resource 102 itself provisions the session (e.g., obtains any needed authentication or authorization information for the session), in some situations identity provider 105 provisions an identity for use in the session. Identity provider 105 may be based on protocols such as security assertion markup language (SAML), OpenID, or others. As discussed further below, identity provider 105 may assert a valid identity, on behalf of the identity associated with auxiliary device 101, following an authentication process for the identity associated with auxiliary device 101.

Figure 2A:
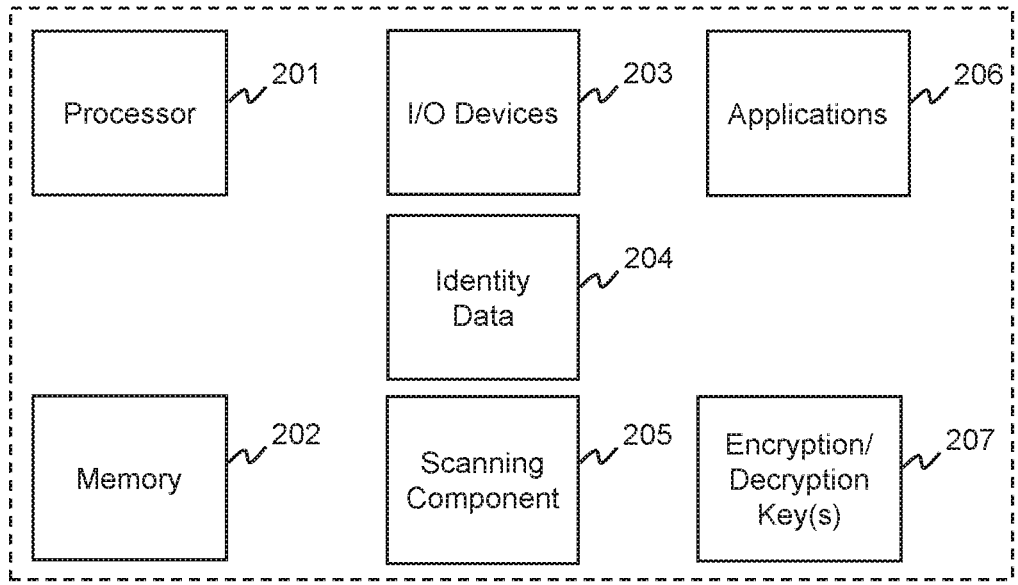
FIG. 2A is a block diagram of exemplary system components of an auxiliary device in accordance with disclosed embodiments.
Figure 2B:
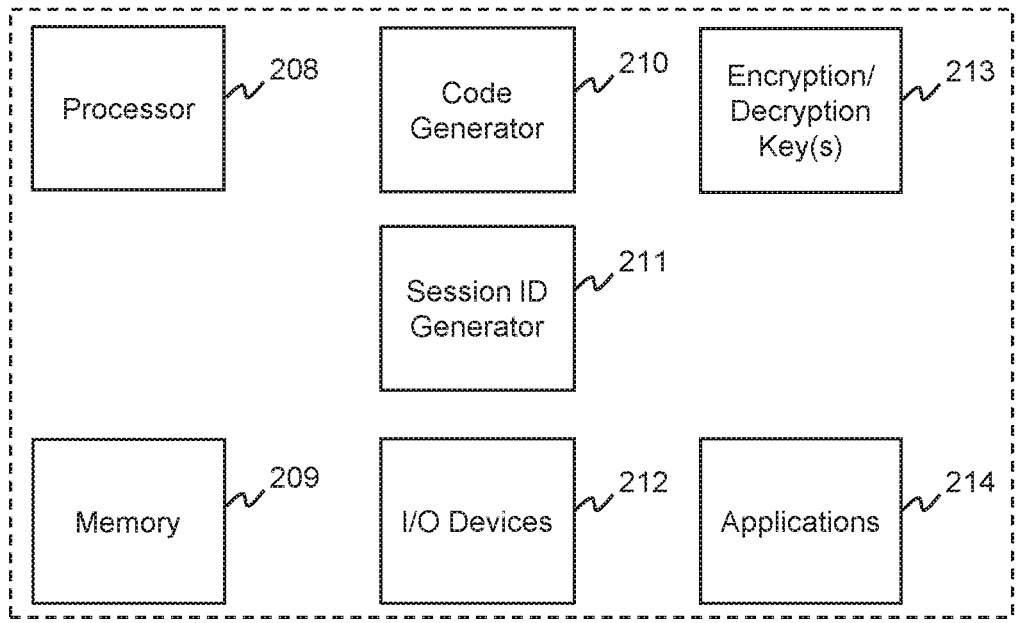
FIG. 2B is a block diagram of exemplary system components of an endpoint resource in accordance with disclosed embodiments.

FIGS. 2A and 2B are, respectively, block diagrams of exemplary components of auxiliary device 101 and endpoint resource 102. Not all of the illustrated components are required to implement the functionality discussed below, and additional components may be added consistent with the discussed functionality as well.

As illustrated, auxiliary device 101 and endpoint resource 102 may each include components such as processor 201/208. Processor (or processors) 201/208 may include one or more data or software processing devices. For example, processor 201/208 may take the form of, but is not limited to, a microprocessor, embedded processor, or the like, or may be integrated in a system on a chip (SoC). Furthermore, according to some embodiments, processor 201/208 may be from the family of processors manufactured by Intel®, AMD® Qualcomm®, Apple®, NVIDIA®, or the like. Processor 201/208 may also be based on the ARM architecture, a mobile processor, or a graphics processing unit, etc. In some use cases, processor 208 may be a server processor while processor 201 may be a mobile device processor. The disclosed embodiments are not limited to any particular type of processor configured in auxiliary device 101 and endpoint resource 102.

Auxiliary device 101 and endpoint resource 102 may also each include input/output devices 203/212. I/O devices 203/212 may include data entry interfaces (e.g., touchscreens, stylus-sensitive screens, keyboards, cursor devices, etc.), data exchange interfaces (e.g., USB, Firewire™, etc.), audio devices (e.g., speaker, microphone, etc.), and network interfaces based on a variety of network protocols (e.g., Ethernet, cellular, WiFi, Bluetooth®, RFID, NFC, RF, infrared, etc.). Further, auxiliary device 101 and endpoint resource 102 may each include one or more memories 202/209. Memory (or memories) 202/209 may include one or more storage devices or media configured to store instructions used by processors 201/208, respectively, to perform functions related to the disclosed embodiments. Memory 202/209 may be configured to store software instructions, such as applications 206/214, that perform one or more operations when executed by the processor 201/208 to authenticate an identity of auxiliary device 101 or securely transmit data, as discussed in connection with FIGS. 3A-3H, 4A-4B, and 5 below. The disclosed embodiments are not limited to particular software types or devices configured to perform dedicated tasks. For example, memory 202/209 may store a single program, such as a user-level application 206/214, that performs the functions of the disclosed embodiments, or may comprise multiple software programs. Additionally, the processor 201/208 may in some embodiments execute one or more programs (or portions thereof). Furthermore, the memory 202/209 may include one or more storage devices or media configured to store data for use by the applications 206/214. In some cases, memory 201 of auxiliary device 101 may be, or include, a secure mobile memory environment (e.g., ARM TrustZone™, Apple Secure Enclave™, Google Titan M™, Android Trusted Execution Environment™, etc.). In such embodiments, the secure memory environment may also have a separate secure processor for performing some or all of the functionality discussed below.

Auxiliary device 101 may also include identity data 204, which may be stored in memory 202. Identity data 204 may be, for example, user credentials (e.g., name, account name, employee ID, organization, etc.), a digital certificate (e.g., X.509 certificate), a user ID, a government issued number (e.g., social security number), or other identifying data for the identity. In embodiments where auxiliary device 101 has a secure memory or processing environment (e.g., ARM TrustZone™, Apple Secure Enclave™, Google Titan M™, Android Trusted Execution Environment™, etc.), identity data 204 may optionally be stored in that environment. Further, as discussed below, identity data 204 may be encrypted and the user may be required to biometrically identify themself in order to decrypt the identity data 204.

As shown in FIGS. 2A and 2B, auxiliary device 101 may also have a scanning component 205, which is configured to scan codes generated by code generator 210 of endpoint resource 102. For example, code generator 210 may be an application configured to generate a scannable or machine-readable code that encodes information (e.g., session identifier, cryptographic key, etc.). For example, code generator 210 may be a software code, a script, or application stored on memory 209 and/or executed by processor 208. Code generator 210 may be capable of encoding information according to a variety of different formats, such OR code (e.g., using ISO/IEC 18004:2015), data matrix code, Aztec code, PDF417 code, MicroPDF417 code, CodaBlock-F code, MaxiCode code, Microsoft Tag code, Shotcode code, encoded image, geometric pattern, color pattern, etc. In some embodiments, code generator 210 is configured to generate an audible code that may be produced via a loudspeaker (e.g., I/O device 212) and received via a microphone (e.g., I/O device 203) of auxiliary device 101. Other encoding formats are possible as well. Correspondingly, scanning component 205 may be configured to optically scan, read, or otherwise detect the codes generated by code generator 210 and made available from endpoint resource 102 to auxiliary device 101. That is, scanning component 205 may be a software code, a script, or application stored on memory 202 and/or executed by processor 201 that corresponds to the coding techniques used by code generator 210.

Auxiliary device 101 and endpoint resource 102 may also have various applications 206/214, which may be stored in memories 202/209 and executed by processors 201/208. For example, auxiliary device 101 may run an application or agent configured to detect encoded machine-readable codes generated by endpoint resource 102, decode the codes (e.g., via scanning component 205), retrieve locally stored identity data (e.g., identity data 204), perform a biometric authentication of the identity (e.g., based on biometric data such as fingerprints, retinas, faces, hair follicles, saliva, walking patterns, etc.), and transmit data such as identity data and a received session identifier to either endpoint resource 102 or intermediary resource 104. In addition, applications 206 may include one or more network-based applications configured to interact with endpoint resource 102 over a secure session. Such applications 206 may take various forms, such as business applications, personal applications, social media applications, and more. Correspondingly, applications 214 may include an endpoint application or agent configured to generate or receive unique session identifiers, make available encoded machine-readable codes to auxiliary device 101, receive identity data, and authenticate a requesting identity associated with auxiliary device 101. The operations of applications 206 and 214 are further discussed below in conjunction with FIGS. 3A-3H, 4A-4B, and 5.

Auxiliary device 101 and endpoint resource 102 may additionally each store one or more cryptographic encryption or decryption keys 207/213. For example, in some embodiments endpoint resource 102 may generate or retrieve asymmetric key pairs (e.g., generated using algorithms such as RSA, Transport Layer Security (TLS), S/MIME, PGP, GPG, or various other algorithms). Endpoint resource 102 may then, as discussed further below, make one of the keys (e.g., the public key from the pair) available to auxiliary device 101. This may be done by encoding the public key in the same machine-readable code (e.g., OR code, audible code, etc.) that also contains the unique session identifier), or by separately providing the public key to auxiliary device 101. Auxiliary device 101 may then use the public key to encrypt its outgoing communications. For example, as discussed below, when auxiliary device 101 transmits the unique session identifier and its identifying data to either endpoint resource 102 or intermediary resource 104, that transmission may be encrypted using the public key that auxiliary device 101 received from endpoint resource 102. Accordingly, endpoint resource 102 may maintain the private key from the pair (or share the private key with intermediary resource 104), so that the encrypted communication from auxiliary device 101 can be decrypted. In alternate embodiments, encryption/decryption keys 207/213 may be symmetric cryptographic keys (e.g., generated using algorithms such as Twofish, DES, Blowfish, AES, Serpent, etc.).

As shown in FIG. 2B, endpoint resource 102 may also include a session identifier generator 211. As discussed further below, session identifier generator 211 may be an application or agent configured to generate unique session identifiers for purposes of authenticating identities associated with auxiliary devices 101. For example, session identifier generator 211 may be configured to generate a globally unique identifier (QUID), universally unique identifier (UUID), random string of numbers and/or letters, or other types of unique data elements. As discussed below, this unique session identifier may be made available to auxiliary device 101 through an encoded machine-readable code or transmitted in plaintext to auxiliary device 101. While FIG. 2B illustrates session identifier generator 211 as being a component of endpoint resource 102, in other embodiments, session identifier generator 211 is a component of intermediary resource 104. In that case, intermediary resource 104 may be configured to provide the generated unique session identifier to endpoint resource 102, which in turn may make the session identifier available to auxiliary device 101 for reading and/or decoding.

FIGS. 3A-3H illustrate techniques for dynamically providing coupling between auxiliary computing devices 101 and secure endpoint computing resources 102. Notably, FIGS. 3A-3H include several optional features and alternatives which are not all required to be practiced in order to securely authenticate auxiliary computing device 101 or establish a session with endpoint resource 102.

Figure 3A:
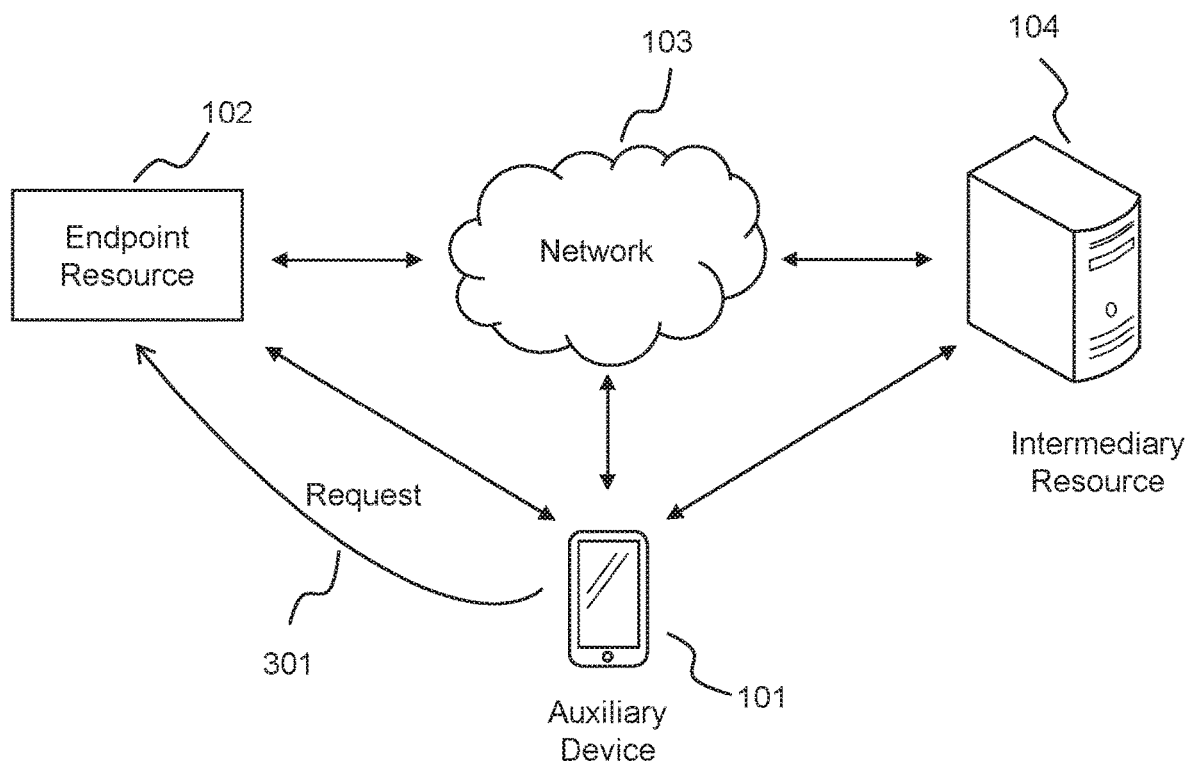
FIG. 3A is a block diagram of an exemplary system where an auxiliary device requests access to an endpoint resource in accordance with disclosed embodiments.

As illustrated in FIG. 3A and system 300A, an auxiliary device 101 may make a request 301 access to endpoint resource 102 or an application running on endpoint resource 102. For example, this may involve a user attempting to log in to their personal computer (e.g., log in to an operating system), which may be endpoint 102. Further, this may involve a user attempting to access a particular application on their computer or a remote computer. In other embodiments, this may involve a user attempting to access an IoT device, such as a home appliance, a vehicle, a parking garage controller, a room entry access controller, etc.

Notably, the request 301 for access to endpoint resource 102 need not include any authentication credentials from the identity or auxiliary device 101. Accordingly, when the request 301 is received by endpoint resource 102, endpoint resource 102 may or may not be able to recognize the identity seeking access. In some embodiments, therefore, the identity may be presented with a screen at endpoint resource 102 indicating that access is not permitted or that an authentication process is being performed. The nature of request 301 may be different in different embodiments. For example, in some embodiments the request 301 may be transmitted or detected based on the user attempting to interact with an application provided by endpoint resource (e.g., clicking on the application, attempting to run the application, etc.). In further embodiments, the request 301 may be based on detecting the presence of the user or auxiliary device 101 in proximity to endpoint resource 102. For example, if endpoint resource 102 is part of a vehicle, hotel room, or conference room, a motion detector or signal-strength detector may detect the proximity of auxiliary device 101 to endpoint resource 102, Upon detecting that proximity, endpoint resource 102 may automatically interpret the proximity as a request 301 for access to endpoint resource 102 or an application it hosts (e.g., an application controlling entry to the vehicle, hotel room, conference room, etc.).

Figure 3B:
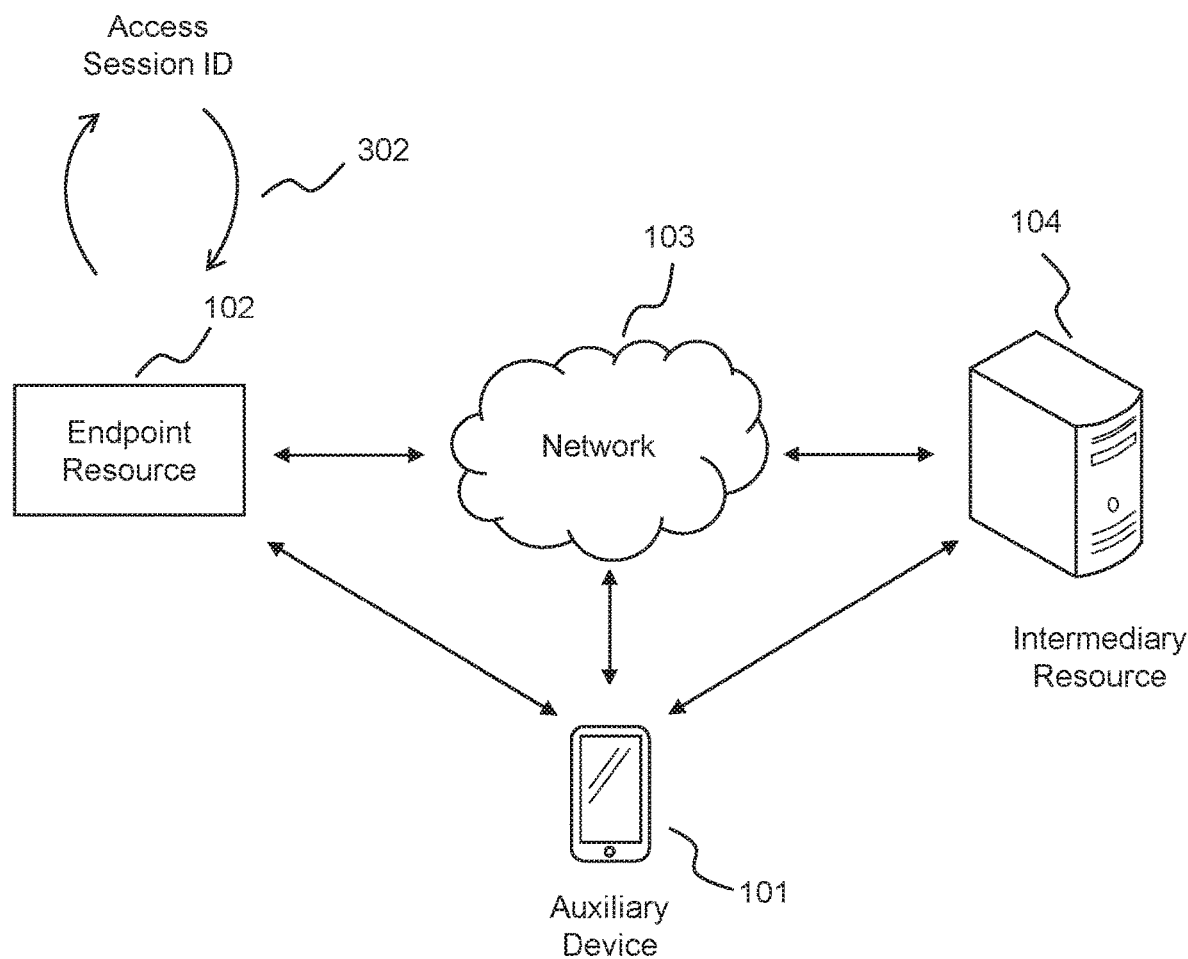
FIG. 3B is a block diagram of an exemplary system where an endpoint resource obtains a session identifier in accordance with disclosed embodiments.

As illustrated in FIG. 3B and system 300B, once endpoint resource 102 receives or detects the request 301 for access, endpoint resource 102 may obtain a unique session identifier. This may involve, for example, locally generating the unique session identifier at endpoint resource 102 (e.g., using session ID generator 211 of FIG. 2B) or requesting the unique session identifier from intermediary resource 104. As discussed above, the unique session identifier may be a UUID, GUID, or random alphanumeric, numerical, or alphabetical string of characters, or other types of unique identifiers. In some embodiments, the unique session identifier is both unique and short-lived. For example, the unique session identifier may have a time-to-live parameter, expiration parameter, one-time-use or one-session-use attribute, or other limitations on its period of viability. As an illustration, if the unique session identifier is specified by endpoint resource 102 to have a period of viability of 60 seconds, the authentication process described below (including auxiliary device 101 returning the unique session identifier to endpoint resource 102) may need to be completed in 60 seconds, or else the authentication may fail.

Figure 3C:
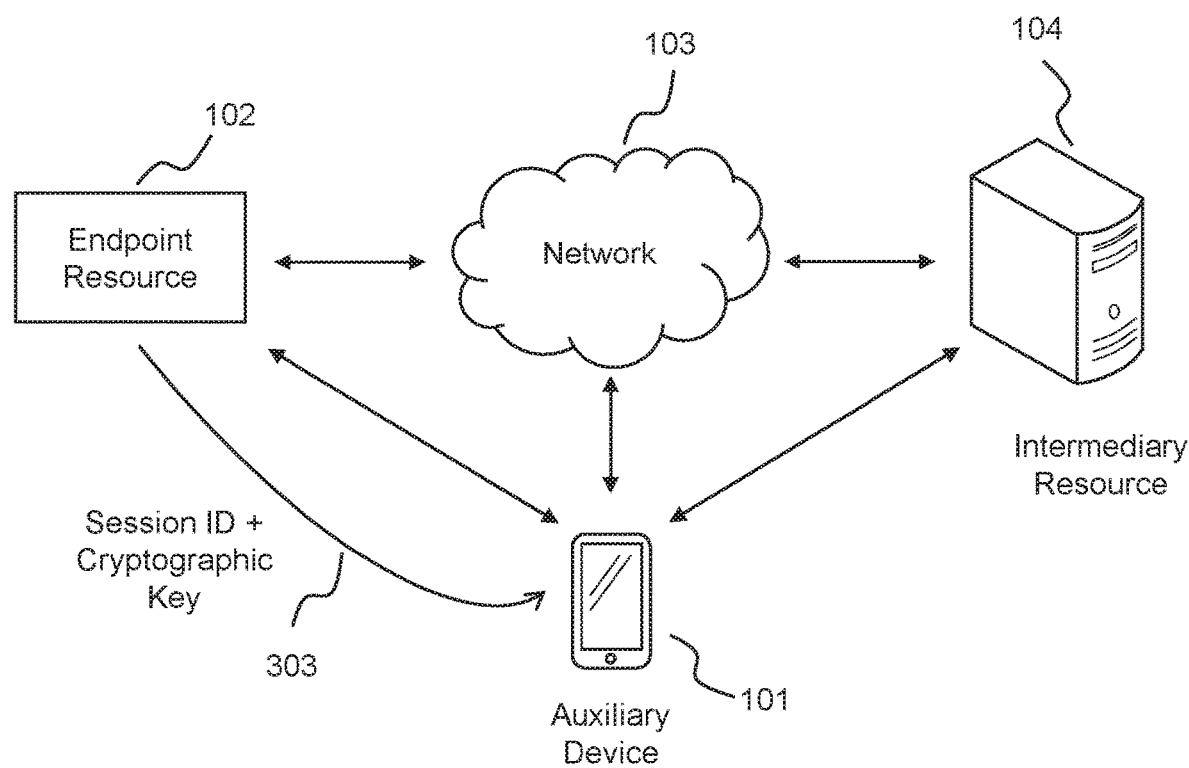
FIG. 3C is a block diagram of an exemplary system where an endpoint resource makes available to an auxiliary device a session identifier and cryptographic key in accordance with disclosed embodiments.

Once endpoint resource 102 obtains the unique session identifier, it may encode the unique session identifier into a machine-readable code, which is made available in operation 303 to auxiliary device 101, as shown in FIG. 3C and system 300C. As discussed above, the encoding may be based on various techniques, such as OR code (e.g., using ISO/IEC 18004:2015), data matrix code, Aztec code, PDF417 code, MicroPDF417 code, CodaBlock-F code, MaxiCode code, Microsoft Tag code, Shotcode code, encoded image, geometric pattern, color pattern, etc. In some embodiments, a cryptographic key (e.g., asymmetric public key or symmetric key) is encoded into the same machine-readable code as the unique session identifier. For example, the two elements may be concatenated and encoded, combined with a spacer or nonce element and encoded, or otherwise both integrated into the same encoded code. Alternatively, the cryptographic key may be made available to auxiliary device 101 separately from the unique session identifier.

Figure 3D:
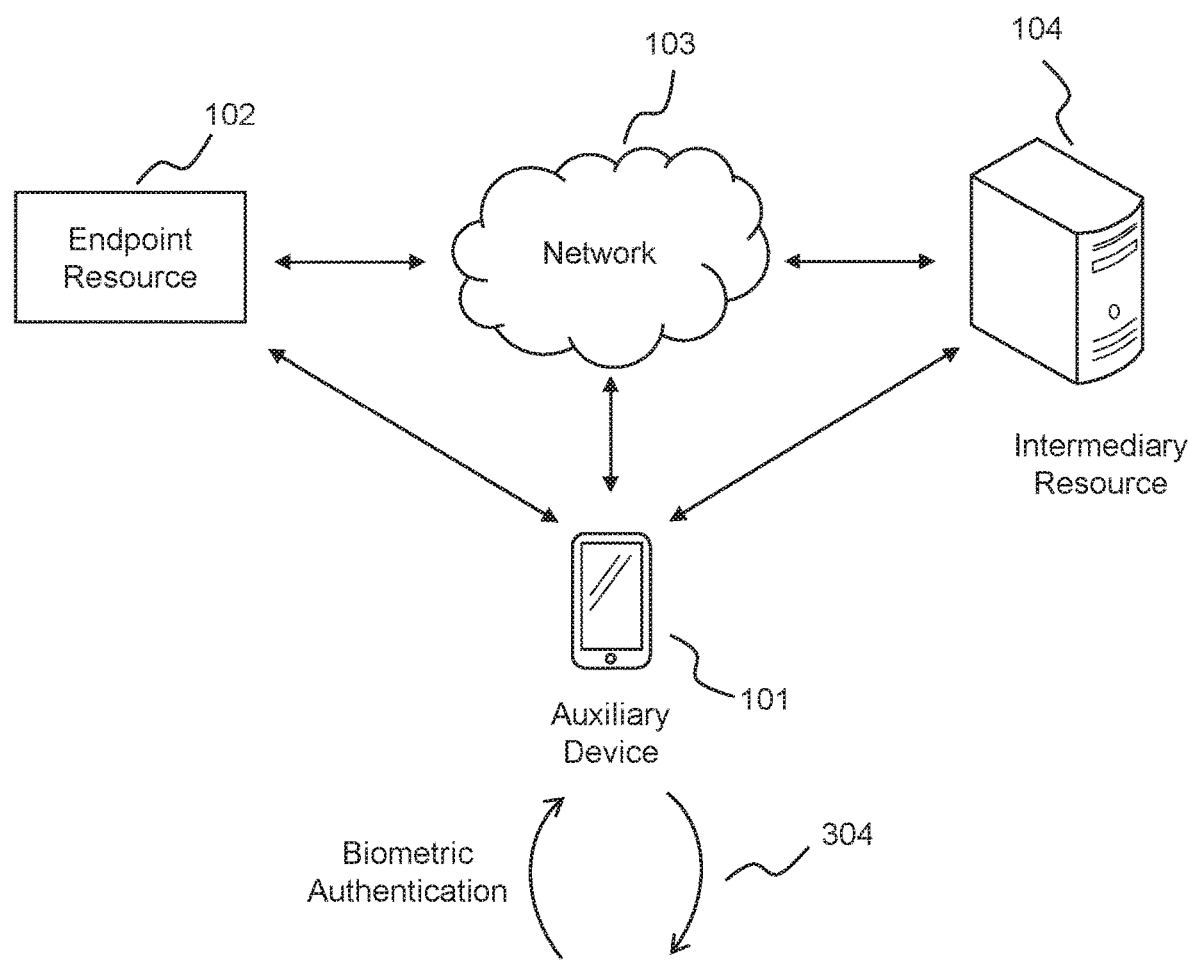
FIG. 3D is a block diagram of an exemplary system where an auxiliary device performs a biometric verification in accordance with disclosed embodiments.

FIG. 3D and system 300D illustrate auxiliary device 101 performing a biometric identification 304 of the identity. In some embodiments, for example, a biometric identification 304 of the user (e.g., based on a scan of a fingerprint, face, retina, hair follicle, saliva, walking pattern, etc.) may be required before auxiliary device 101 will access locally stored user credentials or identifying data. Consistent with the above discussion, the user credentials or identifying data may be personal credentials (e.g., name, account name, employee ID, organization, etc.), a digital certificate (e.g., X.509 certificate), a user ID, a government issued number (e.g., social security number), or other identifying data for the identity. In embodiments where auxiliary device 101 has a secure memory or processing environment (e.g., ARM TrustZone™, Apple Secure Enclave™, Google Titan M™, Android Trusted Execution Environment™, etc.), the user credentials or identifying data may optionally be stored in that environment. Accordingly, if biometric authentication 304 is performed at auxiliary device 101, a successful result of the biometric authentication 304 may be required before the user credentials or identifying data may be retrieved from memory and made available (e.g., decrypted, if they are stored in encrypted form).

Figure 3E:
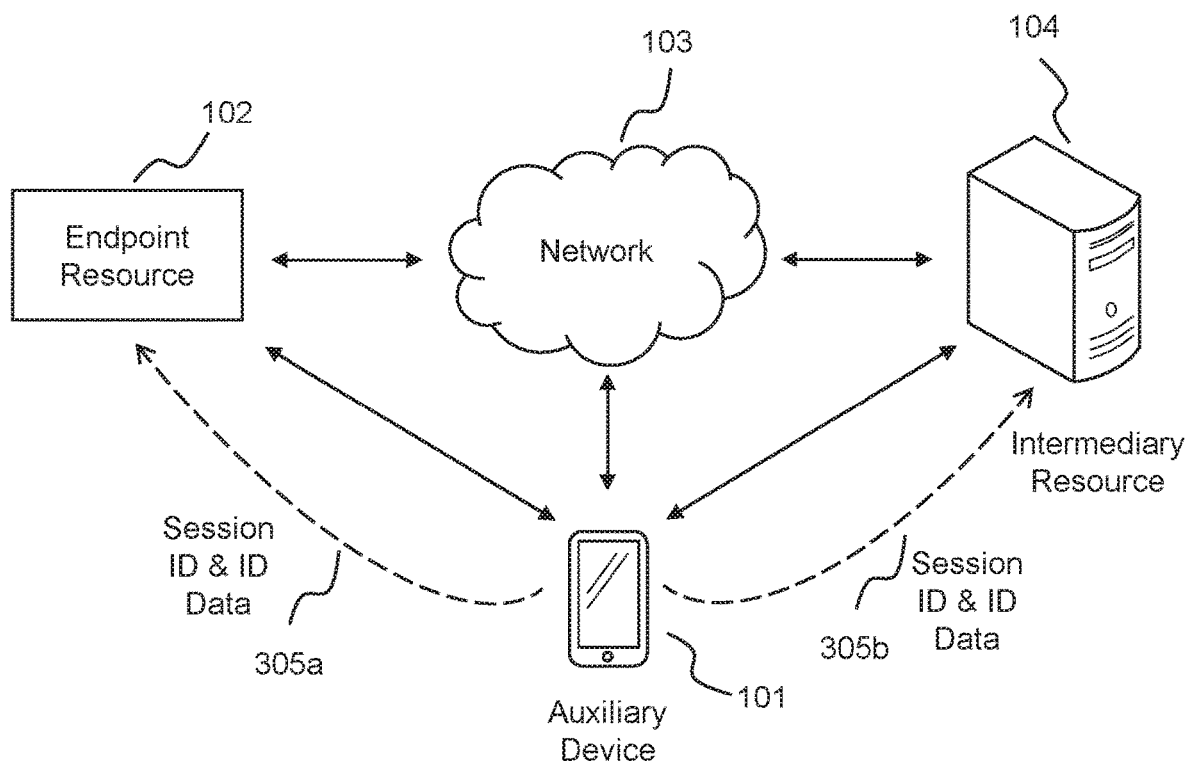
FIG. 3E is a block diagram of an exemplary system where an auxiliary device provides a session identifier and identifying data to an endpoint resource or an intermediary resource in accordance with disclosed embodiments.

FIG. 3E and system 300E illustrate techniques for auxiliary device 101 to make a transmission 305a of the unique session identifier and identity data to endpoint resource 102 or a transmission 305b of the unique session identifier and identity data to intermediary resource 104. In some embodiments, transmission 305a or 305b is made via network 103, while in other embodiments transmissions 305a or 305b are made directly to endpoint resource 102 or intermediary resource 104. Consistent with the discussion above, transmissions 305a or 305b may include both the unique session identifier and identifying data associated with the identity of auxiliary device 101. Further, in some embodiments, transmissions 305a or 305b may be encrypted by a cryptographic key of auxiliary device 101. As discussed above, if auxiliary device 101 receives a public key or symmetric key from endpoint resource 102, transmissions 305a or 305b may be encrypted with that key. In situations where transmission 305b provides the unique session identifier and identity identifying data to intermediary resource 104, intermediary resource 104 may in turn provide the unique session identifier and identity identifying data to endpoint resource 102.

Figure 3F:
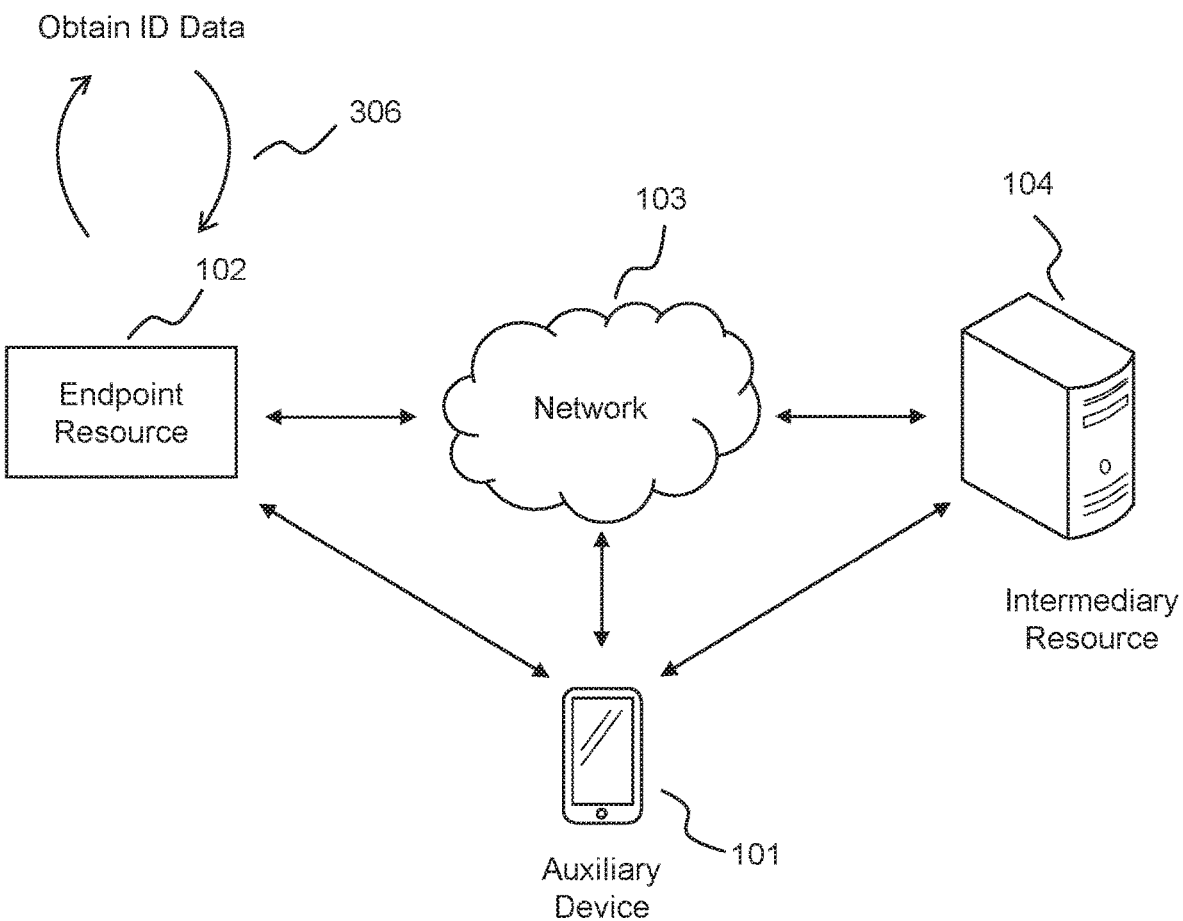
FIG. 3F is a block diagram of an exemplary system where an endpoint resource obtains identifying data in accordance with disclosed embodiments.

FIG. 3F and FIG. 300F illustrate techniques where endpoint resource 102 obtains in operation 306 the unique session identifier and identity identifying data. For example, if auxiliary device 101 directly transmits the unique session identifier and identity identifying data to endpoint resource 102, operation 306 may include receiving the unique session identifier and identity identifying data from auxiliary device 101. Alternatively, operation 306 may include endpoint resource 102 receiving the unique session identifier and identity identifying data from intermediary resource 104.

Figure 3G:
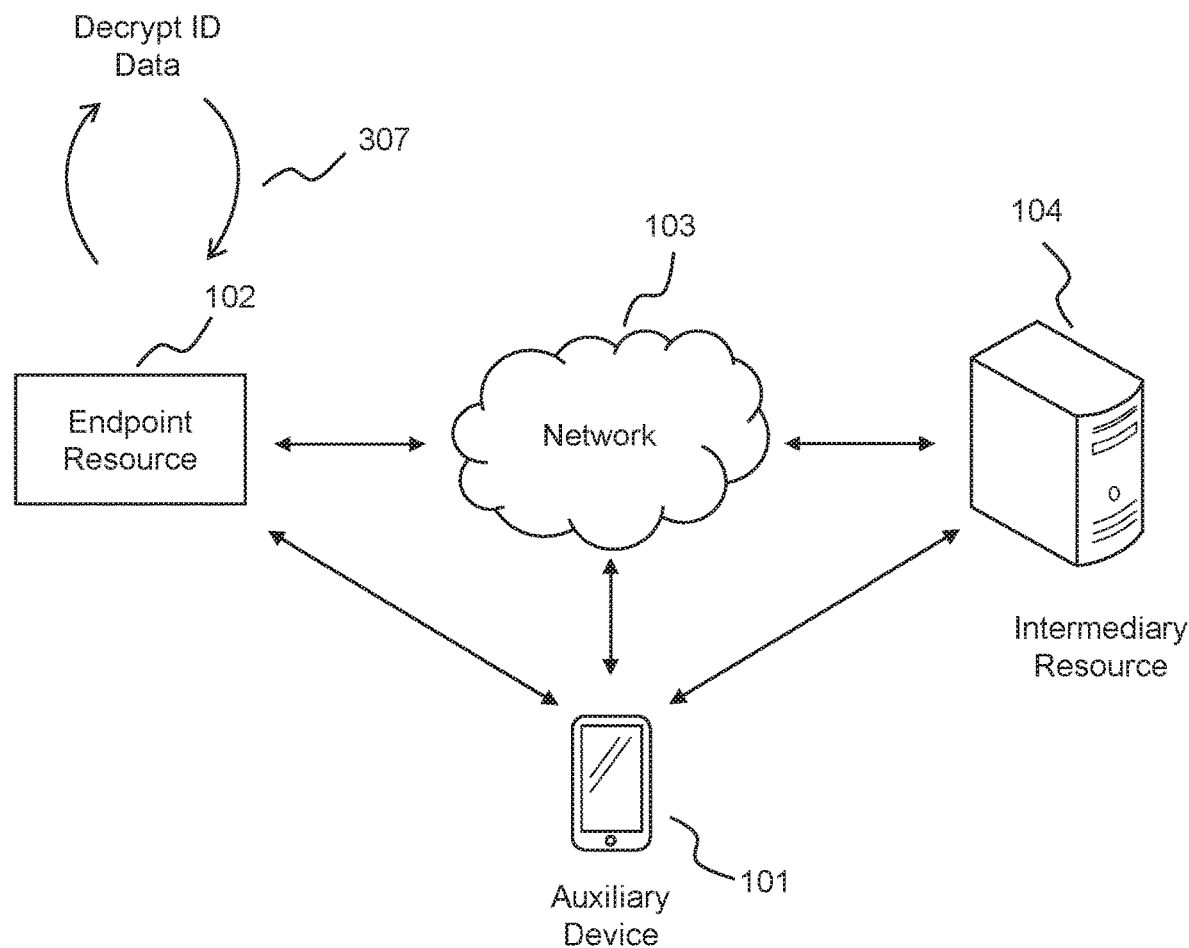
FIG. 3G is a block diagram of an exemplary system where an endpoint resource decrypts the identifying data in accordance with disclosed embodiments.

In accordance with FIG. 3G and 300G, if the transmission 305a or 305b from auxiliary device 101 is encrypted, endpoint resource 102 may decrypt the communication in operation 307. For example, if endpoint resource 102 generated or accessed an asymmetric key pair, it may locally store the private key and may have transmitted the public key to auxiliary device 101. In that situation, if auxiliary device 101 encrypted its transmission 305a or 305b with that key, endpoint resource 102 may decrypt the communication with its corresponding private key. Alternatively, if endpoint resource 102 provided auxiliary device 101 with a symmetric key, and auxiliary device 101 encrypted its outbound transmission 305a or 305b with that key, endpoint resource 102 may decrypt that communication with its corresponding symmetric key. Of course, in embodiments where transmission 305a or 305b is not encrypted, endpoint resource 102 need not decrypt the session identifier or identity data it receives.

Figure 3H:
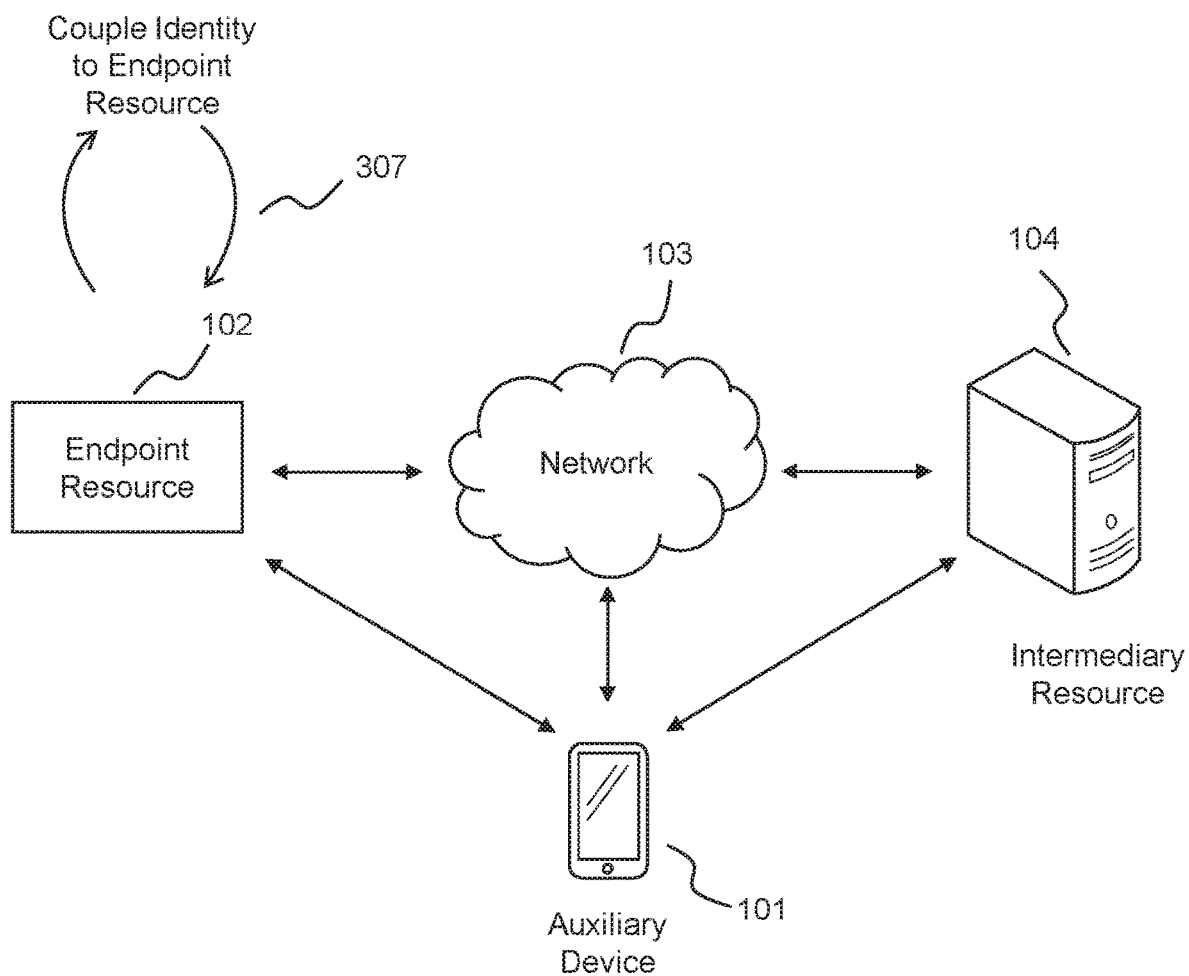
FIG. 3H is a block diagram of an exemplary system where an endpoint resource dynamically couples the identity to the endpoint in accordance with disclosed embodiments.

FIG. 3H and system 300H illustrate endpoint resource 102 adaptively and dynamically coupling 307 the identity of auxiliary device 101 to endpoint resource 102 in a secure communications session. In some embodiments, endpoint resource 102 itself provisions the secure session with the identity, while in other embodiments the session is established by identity provider 105.

For example, operation 307 may involve endpoint resource 102 or intermediary resource 104 verifying the unique session identifier that auxiliary device 101 returned. This may involve, for example, determining whether the returned session identifier matches the session identifier generated for and made available to auxiliary device 101. Further, in some embodiments operation 307 may involve determining whether the received session identifier is still valid (e.g., has not expired). If endpoint resource 102 receives a valid and matching session identifier from auxiliary device 101 (either directly, or via intermediary resource 104), endpoint resource 102 may further attempt to match the identity identifying data provided from auxiliary device 101 with a record for the identity. For example, endpoint resource 102 may maintain records of various identities associated with auxiliary devices 101. When endpoint resource 102 receives particular identity identifying data from an identity of auxiliary device 101, it may use that identifying data to either log-in the identity to a session with an application on endpoint resource 102, or use that identifying data to retrieve log-in credentials for the identity. As an example, if the identity identifying data received from auxiliary device 101 is an account name or account number, endpoint resource 102 may use that identifier as a look-up variable to retrieve log-in credentials (e.g., log-in username, password, token, or other credential) sufficient to establish a secure session for the identity with endpoint resource 102. The log-in credentials may be stored or created locally by endpoint resource 102, or in some embodiments may be retrieved from a separate credentials vault (e.g., CyberArk™ vault). Alternatively, in embodiments where identity provider 105 provisions a log-in credentials for the identity, identity provider 105 may establish a secure session between the identity and endpoint resource 102 (e.g., using SAML, OpenID, etc.).

In some embodiments, after the identity is authenticated by endpoint resource 102 or intermediary resource 104, the identity may be logged in to a session with endpoint resource 102 on a limited-rights basis. For example, in some situations a default identity may be provisioned for the session involving no privileges, or only basic privileges (e.g., read-only), with respect to endpoint resource 102. Further, in some situations the identity provisioned for the session may be a limited-use (e.g., single use, or time-limited) identity. Accordingly, the user may be not allowed to log in subsequently with the same identity. In some environments, the automatically provisioned session between the identity and endpoint resource 102 may be a default (e.g., non-privileged or minimally privileged) session type. For some authenticated identities, on the other hand, some elevated privileges may be included for the identity in the session. For example, if the authenticated identity of auxiliary device 101 is verified to be an administrator or IT personnel (e.g., based on the identity identifying data it provided), that identity may be automatically logged in to a session with endpoint resource 102 having elevated privileges. Alternatively, in some situations all identities are logged in to endpoint resource 102 with no privileges or weak privileges, and the identity may achieve elevated privileges only by engaging in supplemental authentication (e.g., biometric authentication, two-factor authentication, answering a security prompt, etc.). Further, in some embodiments the level of privileges of the identity may depend on whether the transmission from auxiliary device 101 containing the unique session identifier and identifying data was encrypted and subsequently successfully decrypted by endpoint resource 102. For example, if endpoint resource 102 successfully performs the decryption, the privileges of the identity may be elevated above a minimal level. As noted above, each of these variations on the automatic coupling between the identity and endpoint resource 102 may be performed either by endpoint resource 102 itself or by identity provider 105.

Figure 4A:
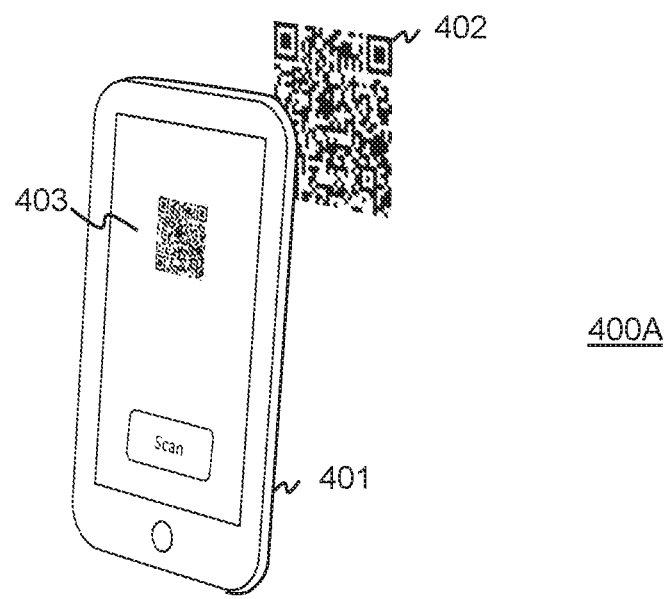
FIG. 4A is an illustration of an exemplary technique of an auxiliary device optically scanning a code containing a session identifier in accordance with disclosed embodiments.
Figure 4B:
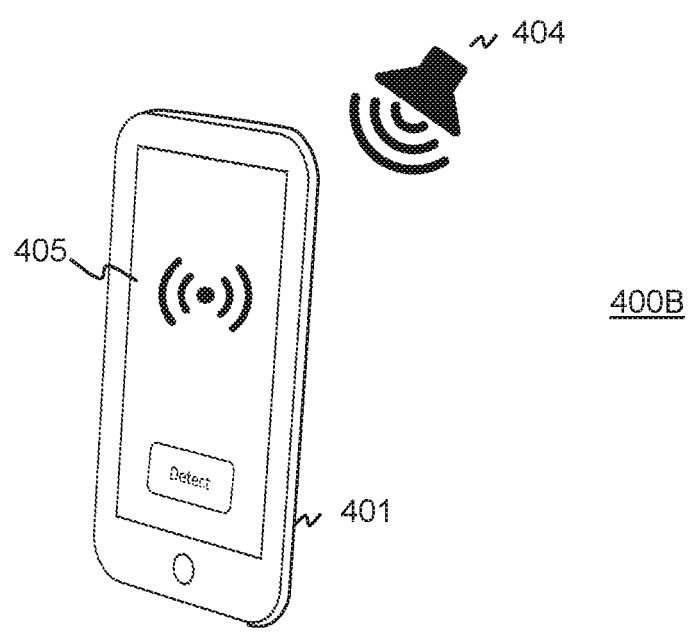
FIG. 4B is an illustration of an exemplary technique of an auxiliary device audibly detecting a code containing a session identifier in accordance with disclosed embodiments.

FIGS. 4A and 4B illustrate exemplary techniques consistent with FIG. 3C above for endpoint resource 102 to make available to auxiliary device 101 a unique session identifier and/or a cryptographic key, or a machine-readable code that encodes the unique session identifier and/or cryptographic key. For example, according to technique 400A auxiliary device 401 may optically scan (e.g., using an integrated camera) a OR code 402 that encodes the unique session identifier and/or cryptographic key. The OR code 402 may appear as an integrated component in a web page being accessed by a user (e.g., a web page generated by endpoint resource 102 or separately), as part of an application interface, or on a printed medium. The scanned version of the OR code 403 may then be decoded by auxiliary device 401 to reveal the unique session identifier and/or cryptographic key themselves. Similarly, according to technique 400B, auxiliary device 401 may audibly detect (e.g., using an integrated microphone) an audibly transmitted code 404 that encodes the unique session identifier and/or cryptographic key. The detected audible code 405 may then be decoded by auxiliary device 401 to reveal the unique session identifier and/or cryptographic key. As discussed above, other variations on endpoint resource 102 making available to auxiliary device 101 the machine-readable code are possible too. For example, other types of visual codes (e.g., one-dimensional barcode, two-dimensional barcode, encoded image, geometric pattern, etc.) may be scanned and decoded by auxiliary device 401. Similarly, in some embodiments the machine-readable code may be transmitted over short-range wireless (e.g., Bluetooth™, NFC, etc.) or wired (e.g., USB, Firewire™, etc.) communications to auxiliary device 401.

Figure 5:
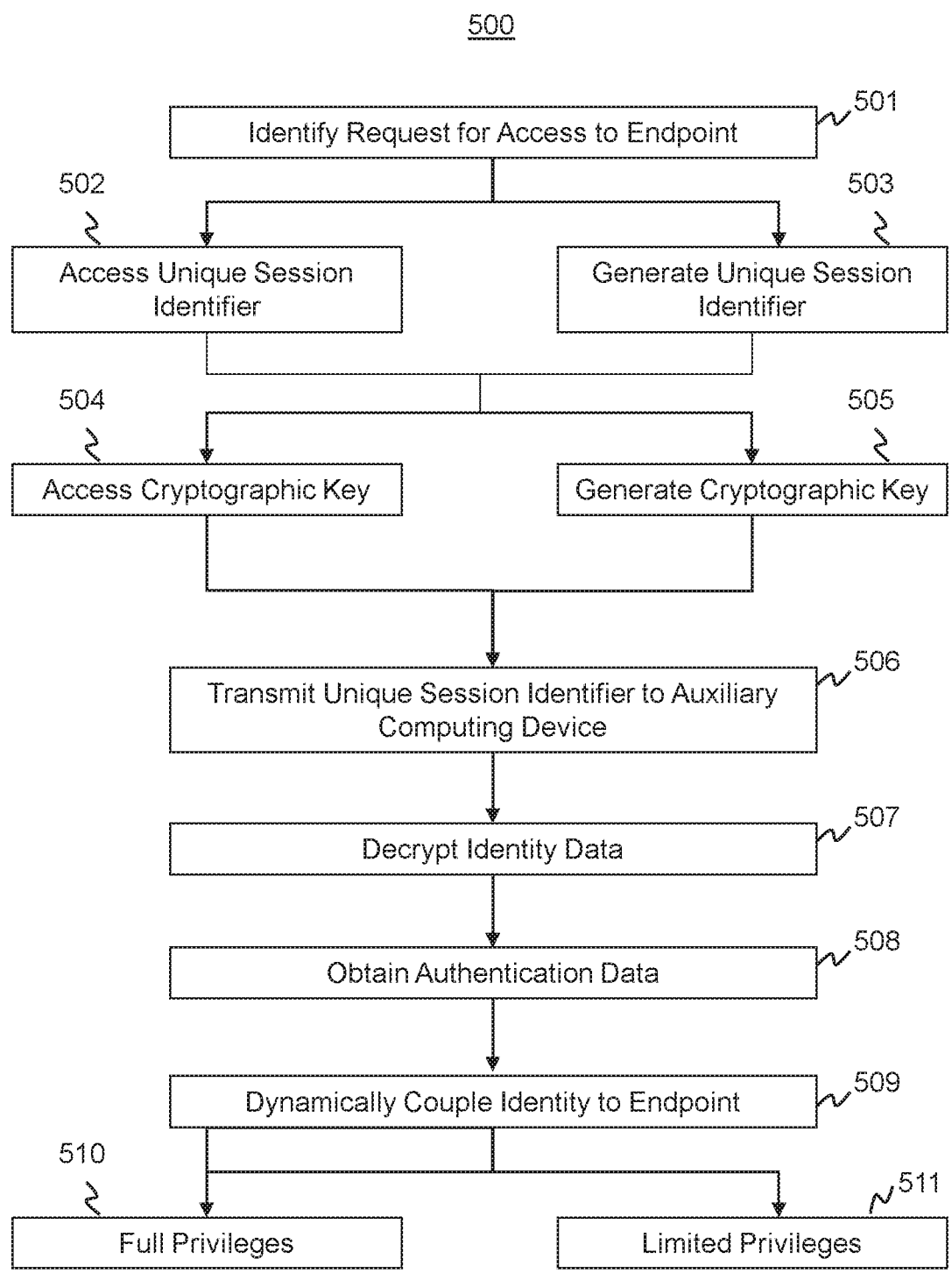
FIG. 5 is a flowchart depicting an exemplary process for dynamically providing coupling between auxiliary computing devices and secure endpoint computing resources in accordance with disclosed embodiments.

FIG. 5 illustrates exemplary process 500 for dynamically providing coupling between auxiliary computing devices and secure endpoint computing resources. Process 500 may be implemented in the system environments described above in connection with FIGS. 1A-1B, 2A-2B, and 3A-3H. For example, process 500 may be implemented by endpoint resource 102 (e.g., a security application or agent running on endpoint resource 102).

In operation 501, process 500 may include identifying a request for an identity to access an endpoint resource. Consistent with the discussion above regarding FIG. 3A, the request may involve the identity attempting to log-in to endpoint resource 102 or an application (e.g., operating system or separate application) hosted by endpoint resource 102. Further, the request may involve the identity attempting to access a physical system or location, such as a network-connected vehicle, a controlled-access room, a parking lot, a building, etc. In such situations, the request may be a specific prompt initiated by the identity (e.g., attempting to open a door, pressing an access button, etc.), or may be inferred based on the identity's detected proximity to the endpoint. For example, the proximity between the identity's auxiliary device and the endpoint may be detected based on wireless signals (e.g., Bluetooth™, NFC, etc.), by motion sensors of the endpoint, or by other techniques. Notably, according to these techniques for the identity to request access to the secure endpoint, the identity need not provide authentication credentials (e.g., username, password, etc.). Instead, the identity may be authenticated, and access may be provided to the endpoint, without the identity needing to supply such credentials as part of the request.

Operations 502 and 503 illustrate different techniques for obtaining a unique session identifier in response to the request. Consistent with FIG. 3B above, operation 502 may include accessing a unique session identifier (e.g., locally stored at endpoint resource 102 or retrieved from intermediary resource 104), and operation 503 may include generating the unique session identifier. As discussed above, the unique session identifier may be various types of unique character strings, such as a GUID, UUID, random number, etc. The unique session identifier may or may not have an expiration or time-to-live attribute. For example, in some situations unique session identifiers are used by the endpoint for only one authentication of a particular identity. After that single use, the unique session identifier may be deleted or disabled for future use.

In operations 504 and 505, different techniques may be performed for obtaining a cryptographic key. For example, as discussed above in connection with FIG. 3C, endpoint resource 102 may access a locally stored key in operation 504 or may dynamically generate a key in operation 505. The keys obtained at endpoint resource 102 may be an asymmetric (public-private) key pair, or may be a symmetric key. When endpoint resource 102 generates a machine-readable code to make available to auxiliary device 101, the code may include both the unique session identifier and the cryptographic key (e.g., public or symmetric key). Alternatively, the key may be provided to auxiliary device 101 separate from the unique session identifier (e.g., in a separate machine-readable code or in a separate transmission).

Operation 506 includes transmitting the unique session identifier via short-range communications from the endpoint computing resource to an auxiliary computing device associated with the identity. This may be done in several ways, as discussed above in connection with FIG. 3C. For example, the unique session identifier may be wirelessly transmitted to auxiliary device 101 via Bluetooth™, NFC, RFID, infrared, or other short-range wireless techniques, or may be audibly transmitted via a loudspeaker of endpoint resource 102. Further, the unique session identifier may be transmitted in some cases to auxiliary device 101 via USB, Firewire™, or other local wired techniques. In further embodiments, the unique session identifier may be encoded into a machine-readable code (e.g., QR code, Aztec code, one-dimensional barcode, encoded image, audible code, etc.) and made available for optical scanning or other detection by auxiliary device 101.

As discussed above, auxiliary device 101 may be configured to transmit via short-range communications the unique session identifier and identification data associated with the identity of auxiliary device 101 to at least one of endpoint computing resource 102 or intermediate resource 104. In some embodiments, access to the identification data may be conditional on the user of auxiliary device 101 performing a biometric identification, as discussed in connection with FIG. 3D. For example, if the identification data is stored in a secure memory environment of auxiliary device 101 (e.g., ARM TrustZone™, Apple Secure Enclave™, Google Titan M™, Android Trusted Execution Environment™, etc.), access to the identification data or decryption of the identification data (if stored in encrypted form) may be conditional on the user of auxiliary device 101 biometrically identifying themselves to auxiliary device 101. Further, in some embodiments when auxiliary device transmits the unique session identifier and identifying data to endpoint resource 102 or intermediary resource 104, the transmission may be encrypted. As described in connection with FIG. 3E, the transmission may be encrypted with a key (e.g., public or symmetric key) that endpoint resource 102 provided to auxiliary device 101.

If the transmission from auxiliary device 101 to endpoint resource 102 or intermediary resource 104 is encrypted, it may be decrypted in operation 507. For example, if endpoint resource 102 had generated an asymmetric key pair and provided the auxiliary device 101 with the public key, endpoint resource 102 may then use the private key to decrypt the transmission received from auxiliary device 101. Similarly, if endpoint resource 102 provided auxiliary device 101 with a symmetric key, endpoint resource 102 may use the same symmetric key to decrypt the transmission from auxiliary device 101. In alternate embodiments, if intermediary resource 104 receives the transmission from auxiliary device 101, the decryption may in some cases be performed by intermediary resource 104. In either case, if the decryption fails, the identity of auxiliary device 101 may be denied access to endpoint resource 102. Similarly, if the unique session identifier returned by auxiliary device 101 in its transmission to endpoint resource 102 or intermediary resource 104 fails to match the session identifier provided to auxiliary device 101, or no session identifier is provided from auxiliary device 101 at all, the identity of auxiliary device 101 may be denied access to endpoint resource 102.

In operation 508, process 500 includes obtaining, in response to the auxiliary computing device transmitting the unique session identifier and the identification data, authentication data sufficient to comply with the authentication requirement of the endpoint computing resource. For example, as discussed in connection with FIG. 3F, the identifying data provided from auxiliary device 101 (e.g., account name, account identifier, organization, ID number, etc.) may be used by endpoint resource 102 to look up an account or profile for the identity. The account or profile may include log-on credentials for the identity sufficient to establish a secure session between the identity and an application running on endpoint resource 102. For example, the credentials retrieved by endpoint resource 102 may be sufficient to log-in the user into an operating system of endpoint resource 102, log-in the user into an application running on endpoint resource 102, permit the user physical access to a vehicle or room controlled by endpoint resource 102, etc. While in some embodiments endpoint resource 102 itself retrieves these credentials for use by the identity, in other embodiments the credentials are retrieved from a separate resource (e.g., CyberArk™ vault). Alternatively, identity provider 105 may provision an identity for the user. For example, identity provider may supply an identity or credentials based on SAML techniques, OpenID techniques, or other identity provisioning techniques.

In operation 509, process 500 may include dynamically coupling the identity to the endpoint computing resource based on the authentication data and consistent with the authentication requirement. For example, based on the look-up or retrieval of authentication data performed in operation 508, a secure session between the identity and the endpoint resource 102 may be automatically established. The session may be, for example, an operating system session, an application session, permitted use of a vehicle, access to a room or other physical space, etc. As discussed above, in some embodiments the automatically established session may be a non-privileged or minimally privileged (e.g., read-only) session, as shown in operation 511. For elevated privileges, the identity may need to perform supplemental authentication. Further, in some embodiments the specific profile of the identity may be associated with higher privileges (e.g., read, write, copy, move, and delete). Accordingly, if the identity is successfully authenticated as discussed above, in some situations the automatic session between the identity and endpoint resource 102 may include all of the identity's permitted privileges, as shown in operation 510.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer eadable program instructions thereon for causing a processor to carry out aspects of the present invention.

The computer readable storage medium can be a tangible device that can retain and store instructions for use by an instruction execution device. The computer eadable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for dynamically providing coupling between auxiliary computing devices and secure endpoint computing resources, the operations comprising:
   identifying a request for an identity to access an endpoint computing resource, the endpoint computing resource having an authentication requirement for access by the identity, wherein the request does not include authentication credentials for the identity;
   obtaining a unique session identifier in response to the request, wherein the unique session identifier is generated or retrieved from a storage resource by the endpoint computing resource;
   transmitting the unique session identifier via short-range communications from the endpoint computing resource to an auxiliary computing device associated with the identity;
   wherein the auxiliary computing device is configured to transmit via short-range communications the unique session identifier and identification data associated with at least one of the identity or the auxiliary computing device to at least one of the endpoint computing resource or an intermediate service separate from the endpoint computing resource;
   obtaining, in response to the auxiliary computing device transmitting the unique session identifier and the identification data, authentication data sufficient to comply with the authentication requirement of the endpoint computing resource, the authentication data being retrieved by the endpoint computing device based on the identification data; and
   dynamically coupling the identity to the endpoint computing resource based on the authentication data and consistent with the authentication requirement.

2. The non-transitory computer readable medium of claim 1, wherein the unique session identifier is received from the intermediate service separate from the endpoint computing resource.

3. The non-transitory computer readable medium of claim 1, wherein the operations further comprise generating, in response to the request, the unique session identifier.

4. The non-transitory computer readable medium of claim 1, wherein transmitting the unique session identifier includes encoding the unique session identifier into a barcode and making available the barcode for display to the auxiliary computing device.

5. The non-transitory computer readable medium of claim 4, wherein the auxiliary computing device is configured to optically scan and decode the barcode to yield the unique session identifier.

6. The non-transitory computer readable medium of claim 1, wherein transmitting the unique session identifier includes transmitting via Bluetooth the unique session identifier to the auxiliary computing device.

7. The non-transitory computer readable medium of claim 1, wherein transmitting the unique session identifier includes transmitting via audible communications the unique session identifier to the auxiliary computing device.

8. The non-transitory computer readable medium of claim 1, wherein dynamically coupling the identity to the endpoint computing resource includes granting the identity full access corresponding to access rights of the identity.

9. The non-transitory computer readable medium of claim 1, wherein dynamically coupling the identity to the endpoint computing resource includes granting the identity limited access corresponding to less than all access rights of the identity.

10. The non-transitory computer readable medium of claim 9, wherein the limited access includes at least one of temporary access to the endpoint computing resource or one-time access to the endpoint computing resource.

11. A computer-implemented method for dynamically providing coupling between auxiliary computing devices and secure endpoint computing resources, the method comprising:
    identifying a request for an identity to access an endpoint computing resource, the endpoint computing resource having an authentication requirement for access by the identity, wherein the request does not include authentication credentials for the identity;
    obtaining a unique session identifier in response to the request, wherein the unique session identifier is generated or retrieved from a storage resource by the endpoint computing resource;
    transmitting the unique session identifier via short-range communications from the endpoint computing resource to an auxiliary computing device associated with the identity;
    wherein the auxiliary computing device is configured to transmit via short-range communications the unique session identifier and identification data associated with at least one of the identity or the auxiliary computing device to at least one of the endpoint computing resource or an intermediate service separate from the endpoint computing resource;
    obtaining, in response to the auxiliary computing device transmitting the unique session identifier and the identification data, authentication data sufficient to comply with the authentication requirement of the endpoint computing resource, the authentication data being retrieved by the endpoint computing device based on the identification data; and
    dynamically coupling the identity to the endpoint computing resource based on the authentication data and consistent with the authentication requirement.

12. The computer-implemented method of claim 11, wherein transmitting the unique session identifier includes encoding the unique session identifier into an encoded data representation and making available the encoded data representation for display to the auxiliary computing device.

13. The computer-implemented method of claim 12, wherein the encoded data representation is inserted into a web page accessible to the auxiliary computing device.

14. The computer-implemented method of claim 12, wherein the encoded data representation is inserted into a graphical interface of an application accessible to the auxiliary computing device.

15. The computer-implemented method of claim 12, wherein the encoded data representation is displayed on a display screen accessible to the auxiliary computing device.

16. The computer-implemented method of claim 11, wherein the obtained authentication data is a security assertion markup language credential.

17. The computer-implemented method of claim 11, wherein the obtained authentication data is an OpenID credential.

18. The computer-implemented method of claim 11, wherein dynamically coupling the identity to the endpoint computing resource includes granting the identity full access corresponding to access rights of the identity.

19. The computer-implemented method of claim 11, wherein dynamically coupling the identity to the endpoint computing resource includes granting the identity limited access corresponding to less than all access rights of the identity.

20. The computer-implemented method of claim 19, wherein the limited access includes at least one of temporary access to the endpoint computing resource or one-time access to the endpoint computing resource.

* * * * *